US010997616B2

(12) United States Patent
Holman et al.

(10) Patent No.: US 10,997,616 B2
(45) Date of Patent: May 4, 2021

(54) SYSTEM AND METHOD FOR CORRELATING COLLECTED OBSERVATION CAMPAIGN DATA WITH SALES DATA

(71) Applicant: Observa, Inc., Seattle, WA (US)

(72) Inventors: Hugh Howard Holman, Seattle, WA (US); Erik Eugene Chelstad, Seattle, WA (US)

(73) Assignee: Observa, Inc., Seattle, WA (US)

( * ) Notice: Subject to any disclaimer, the term of this patent is extended or adjusted under 35 U.S.C. 154(b) by 269 days.

(21) Appl. No.: 15/821,285

(22) Filed: Nov. 22, 2017

(65) Prior Publication Data

US 2018/0144355 A1 May 24, 2018

Related U.S. Application Data

(60) Provisional application No. 62/426,057, filed on Nov. 23, 2016.

(51) Int. Cl.
*G06Q 30/02* (2012.01)
(52) U.S. Cl.
CPC ..... *G06Q 30/0204* (2013.01); *G06Q 30/0201* (2013.01)
(58) Field of Classification Search
CPC .......... G06Q 30/0204; G06Q 30/0201
See application file for complete search history.

(56) References Cited

U.S. PATENT DOCUMENTS

| 6,026,387 A | * | 2/2000 | Kesel | G06Q 30/02 706/45 |
| 6,633,851 B1 | * | 10/2003 | Engler | G06Q 10/10 705/21 |
| 8,064,896 B2 | | 11/2011 | Bell et al. | |

(Continued)

OTHER PUBLICATIONS

"Applying the service profit chain in a retail environment: Challenging the "satisfaction mirror"", R Silvestro, S Cross—International Journal of Service Industry . . . , 2000—emeraldinsight.com (Year: 2000).*

(Continued)

*Primary Examiner* — Jonathan G Sterrett
(74) *Attorney, Agent, or Firm* — FisherBroyles LLP; Kevin D. Jablonski

(57) ABSTRACT

Systems, apparatuses, processes, methods and operations for implementing and managing a data collection for data regarding the observation of product or service related information. In some embodiments, the invention is directed to systems, apparatuses, processes, methods, and operations for enabling an observation campaign to be evaluated, and if desired, modified, based on sales or other data obtained from a merchant or place of business. In some embodiments, a communication or instruction may be generated and provided to a user/observer participant in an observation campaign requesting that they alter some aspect of the setting or environment in which a product is being sold or offered for sale. In some embodiments, such a communication may be provided to a proprietor of a sales location or to a campaign coordinator so that they are aware of a problem with the way a product or service is being marketed or displayed and can take remedial actions if desired.

15 Claims, 6 Drawing Sheets

(56) References Cited

U.S. PATENT DOCUMENTS

| | | | |
|---|---|---|---|
| 9,361,353 | B1 | 6/2016 | Aristides |
| 9,508,082 | B1 | 11/2016 | Mannix et al. |
| 2003/0009373 | A1 | 1/2003 | Ensing et al. |
| 2004/0034684 | A1* | 2/2004 | Payne ............ G06Q 10/10 709/201 |
| 2005/0149382 | A1 | 7/2005 | Fenner et al. |
| 2006/0167971 | A1 | 7/2006 | Breiner |
| 2008/0183552 | A1 | 7/2008 | O'Hagan |
| 2009/0063306 | A1 | 3/2009 | Fano et al. |
| 2009/0204471 | A1 | 8/2009 | Elenbaas et al. |
| 2009/0240516 | A1 | 9/2009 | Palestrant |
| 2010/0171826 | A1 | 7/2010 | Hamilton et al. |
| 2011/0212717 | A1 | 9/2011 | Rhoads et al. |
| 2012/0029978 | A1* | 2/2012 | Olding ............ G06Q 10/06 705/7.42 |
| 2012/0047008 | A1 | 2/2012 | Alhadeff et al. |
| 2012/0265574 | A1* | 10/2012 | Olding ............ G06Q 10/06 705/7.14 |
| 2013/0018957 | A1 | 1/2013 | Pamaby et al. |
| 2013/0079128 | A1 | 3/2013 | Thomas et al. |
| 2013/0132170 | A1 | 5/2013 | Yelisetti et al. |
| 2013/0132987 | A1* | 5/2013 | Narasimhan ..... H04N 21/25866 725/14 |
| 2013/0204652 | A1 | 8/2013 | Marins et al. |
| 2013/0282446 | A1 | 10/2013 | Dobell |
| 2014/0180772 | A1 | 6/2014 | Tutupata et al. |
| 2014/0249889 | A1 | 9/2014 | Park et al. |
| 2014/0278850 | A1* | 9/2014 | Boccuzzi, Jr. ..... G06Q 30/0208 705/14.11 |
| 2014/0324555 | A1 | 10/2014 | Wu et al. |
| 2014/0343984 | A1 | 11/2014 | Shahabi et al. |
| 2014/0379399 | A1 | 12/2014 | Brydon et al. |
| 2015/0032533 | A1 | 1/2015 | Raab et al. |
| 2015/0178742 | A1 | 6/2015 | Smith et al. |
| 2015/0213315 | A1 | 7/2015 | Gross |
| 2015/0254593 | A1 | 9/2015 | Rinze et al. |
| 2015/0347520 | A1 | 12/2015 | King et al. |
| 2015/0356489 | A1 | 12/2015 | Kazai et al. |
| 2016/0027051 | A1 | 1/2016 | Gross |
| 2016/0078499 | A1 | 3/2016 | Brown et al. |
| 2016/0180365 | A1 | 6/2016 | Shi et al. |
| 2016/0253710 | A1 | 9/2016 | Publicover et al. |
| 2016/0350697 | A1* | 12/2016 | Gruen ............ G06Q 10/06395 |
| 2017/0053330 | A1 | 2/2017 | Smith et al. |
| 2017/0098197 | A1 | 4/2017 | Yu et al. |
| 2017/0221156 | A1 | 8/2017 | Mingarelli et al. |
| 2017/0249574 | A1 | 8/2017 | Knijnik et al. |
| 2017/0331877 | A1 | 11/2017 | Balasubramanian et al. |
| 2018/0293616 | A1 | 10/2018 | Greenhood |

OTHER PUBLICATIONS

Applying the service profit chain to analyse retail performance: the case of the managerial strait-jacket? M Pritchard, R Silvestro—International Journal of Service . . . , 2005—emeraldinsight.com (Year: 2005).*

Mystery Shopping as a Tool for Advanced Interaction Quality in Business Relationships—an Exploratory Study U Herbst, S Barisch, M Voeth—. . . . org/uploads/papers/5874. pdf [14.09 . . . , 2007—impgroup.org (Year: 2007).*

ISR/WO dated Jan. 30, 2018 for PCT/US17/062829; filed Nov. 21, 2017.

Grocery & Retail News. "Get Paid for Snooping on Your Supermarket," <URL: http://couponsinthenews.com/2016/05/16/get-paid-for-snooping-on-your-supermarket/>.

ISR/WO dated Mar. 8, 2018; for PCT/US17/062816, filed Nov. 21, 2017.

J. Dawes, B. Sharp—Australian Jornal of Market Research,—rearchgate.net "The reliability and validity of objective measures of customer service; mystery shopping" (2000).

W. Hensens—Journal of Tourism Futures—the future of hotel rating; emeraldinsight.com (2015).

Transferring Knowledge from a Crowd to a Retail Company—a case study of Roamier Sweden S. Gistera, M. Carlander—2015—diva-portal.org (2015).

"A Conceptual Model for Mystery Shopping Motivations", P. Allison, D. Severt, D. Dickson—Journal of Hospitality Marketing & . . . , 2010—Taylor & Francis (2010).

Exploring the Consequences of Shopper-Facing Technologies: Their Effect on Shopper Experiences and Shopping Outcomes; BI Spaid—2014—trace.tennessee.edu (2014).

Morse, David; "Minisize2: A computer program for determining effect size and minimum sample size for statistical significance for univariate, multivariate, and nonparametric tests", Educational and Psychological Measurement; 1999—journals.sagepub.com (Year: 1999).

http://web.archive.org/web/20150226150240/http://www.gigwalk.com/crowdsourcing (Year: 2015).

http://web.archive.org/web/20150223140532/http://www.gigwalk.com/case-study/Gigwalk_mobileretail_whitesheet.html (Year: 2015).

Position validation in crowdsourced accessibility mapping; RM Rice, AO Aburizaiza, MT Rice . . . - . . . : The International Journal . . . , 2016—utpjournals.press (Year: 2016).

The motivations and experiences of the on-demand mobile workforce; R. Teodoro, P. Ozturk, M. Naaman, W. Mason . . . —Proceedings of the 17th . . . , 2014—dl.acm.org (Year: 2014).

* cited by examiner

| CAMPAIGN 300 | Total Cost Outlay 310 |
| --- | --- |
| | Cost per Observation 311 |
| | Total Number of Observations 312 |
| | Time Frame 313 |
| | Geographic Limitations 314 |
| | Diminishing Cost per Observation 315 |
| | Observer Reputation Limitations 316 |
| | Variable Cost Per Transaction 317 |
| | Failure Parameters 318 |
| | Image Quality Parameters 319 |
| | Opportunity/Acceptance Lockout 320 |
| | Observation Success Termination 321 |

*FIG. 3*

SYSTEM AND METHOD FOR CORRELATING COLLECTED OBSERVATION CAMPAIGN DATA WITH SALES DATA

CROSS REFERENCE TO RELATED APPLICATION

This application claims the benefit of U.S. Provisional Application No. 62/426,057, entitled "System and Method for Correlating Collected Observation Campaign Data with Sales Data," filed Nov. 23, 2016, which is incorporated herein by reference in its entirety for all purposes.

BACKGROUND

Individuals and businesses often desire to collect data about various situations that exist in the real-world. For example, a manufacturer of a product may wish to collect data about how the product is being displayed or marketed at a retail location. However, individuals and enterprises, and government and non-governmental agencies, often do not have the time and/or resources available to travel to myriad locations or employ agents to do so to collect information. This challenge becomes greater as the time window for the information collection becomes more specific and/or the physical locations from which the information is to be collected grow in number or distance. For example, merchants or entities in the delivery chain of products for retail sale, whether manufacturers, distributors, wholesalers, brokers, or the like, may need to determine if, when, how much, in what way or condition, whether accompanied by marketing material, or at what price their goods are being made available to consumers. Another example of such a need for information gathered from a location might be a property or business owner that contracts for a periodic service, about which they would like to validate the quality and completeness of the service delivery. In short, the condition of physical locations or some physically observable condition at the locations is often desirable data to observe, obtain, and document.

Sometimes these needs for data occur in a predictable or recurring pattern. In some cases, the data may also be best obtained within a narrow time window. For example, merchants who sell goods and products through retailers often have guidelines, rules, and restrictions regarding how retailers are expected to present and price the goods and products at the purchase location. Merchants (or other entities) may wish to negotiate with retailers for specific shelf space for the merchant's goods and products, or the merchant may wish to disallow lowering of the retail price for the merchant's goods and products overall, at a specific location, or during a specific time period.

Individuals and business wishing to obtain observable real-world data for purposes of confirming the proper display, pricing, or other characteristic of how a product or service is being offered to consumers may hire staff to ensure that the various standards, conditions, guidelines, rules, and/or restrictions are met. That is, employees or agents may travel to various locations at various times to observe and collect real-world data with regard to various conditions, guidelines, rules, and/or restrictions in order to ensure satisfaction and compliance. Of course, such employees and agents can be expensive in terms of payroll and travel expenses. Therefore, organizations often must rely on others (such as retailers) to follow the negotiated conditions, guidelines, rules, and restrictions. However, at times, those other actors have little incentive to go to any great effort to ensure that standards or conditions are met or to ensure compliance with applicable guidelines, rules, and/or restrictions. As a result, many businesses are unable to ensure that their standards, conditions, guidelines, rules, and/or restrictions are followed with regularity or that deviations from the approved policies or rules are noted and corrected.

Embodiments of the systems, apparatuses, processes, methods, and operations described herein are directed to overcoming these and other limitations of conventional approaches, both individually and in combination.

SUMMARY

The terms "invention," "the invention," "this invention" and "the present invention" as used herein are intended to refer broadly to all subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required or essential features of the claimed subject matter, nor is it intended to be used in isolation to determine the scope of the claimed subject matter. The subject matter should be understood by reference to appropriate portions of the entire specification of this patent, to any or all drawings, and to each claim.

One or more embodiments of the invention are directed to systems, apparatuses, processes, methods and operations for implementing and managing a data collection campaign for data derived from the observation of product or service related information. In some embodiments, the invention is directed to systems, apparatuses, processes, methods, and operations for enabling an observation campaign to be defined and executed. As part of that design and execution, a user's or prospective user's rating may be accessed and used to decide whether to make a specific opportunity or set of opportunities available to a specific user, to process the data received from a certain user in a certain way, what the compensation for participating in an observation campaign will be, or what the rules are that determine when a campaign or an observer's participation in a campaign are completed. Further, as part of that design and execution, in some embodiments, the invention is directed to systems, apparatuses, processes, methods, and operations for enabling an observation campaign to be evaluated, and if desired, modified, based on sales or other data obtained from a merchant or place of business. In some embodiments, a communication or instruction may be generated and provided to a user/observer participant in an observation campaign requesting that they alter some aspect of the setting or environment in which a product is being sold or offered for sale. In some embodiments, such a communication may be provided to a proprietor of a sales location or to a campaign coordinator so that they are aware of a problem with the way a product or service is being marketed or displayed and can take remedial actions if desired.

In one embodiment, the system and methods described herein are directed to a computer-based method, where the method includes establishing an observation campaign for the collection of real-world data regarding a product or service, identifying one or more users for participation in the observation campaign, obtaining sales data related to the product or service, correlating the sales data with collected real-world data; and modifying an aspect of the observation campaign based on the correlation.

In another embodiment, the system and methods described herein are directed to a computing system, where the system includes a user-based mobile computing device configured to execute an observation application to coordinate observing and collecting of real-world data, an observation server computer configured to push a notification that includes one or more opportunities for observations of real-world data to the user-based mobile computing device and configured to receive real-world data observed and collected by the user-based mobile computing device, a computer-based method executing on the observation server computer to process the real-world data observed and collected by the user-based mobile computing device, the processing of the real-world data including accessing sales related data for a product or service for which the real-world data is being collected, correlating the accessed sales related data with the received real-world data; and based on the correlation or correlations, modifying an aspect of the observation campaign, and a computing device communicatively coupled to the observation server computer and configured to generate and control a campaign of opportunities pushed by the observation server computer.

In yet another embodiment, the system and methods described herein are directed to a cloud-based multi-user observation computing system, where the cloud-based system includes a plurality of user-based mobile computing devices each executing an observation application configured to communicate with a server computer hosting observation opportunities, a cloud-based observation platform that includes the server computer for hosting the observation opportunities, the observation platform configured to communicate one or more opportunities to one or more user-based mobile computing devices and configured to receive real-world data collected by one or more of the one or more user-based mobile computing devices, a computer-based method executing on the observation platform to process the real-world data observed and collected by the one or more user-based mobile computing devices, the processing of the real-world data including accessing sales related data for a product or service for which the real-world data is being collected, correlating the accessed sales related data with the received real-world data, and based on the correlation or correlations, modifying an aspect of an observation campaign, and a plurality of computing devices communicatively coupled to the observation platform and configured to generate and alter opportunities as part of one or more observation campaigns, each observation campaign having configurable parameters configurable by at least one of the computing devices.

Other objects and advantages of the present invention will be apparent to one of ordinary skill in the art upon review of the detailed description of the present invention and the included figures.

BRIEF DESCRIPTION OF THE DRAWINGS

Embodiments of the subject matter disclosed herein in accordance with the present disclosure will be described with reference to the drawings, in which:

FIG. 3 is a data structure diagram illustrating parameters of an example observation campaign used in conjunction with the system of FIG. 2 according to an embodiment of the subject matter disclosed herein;

Note that the same numbers are used throughout the disclosure and figures to reference like components and features.

DETAILED DESCRIPTION

Figure 1:
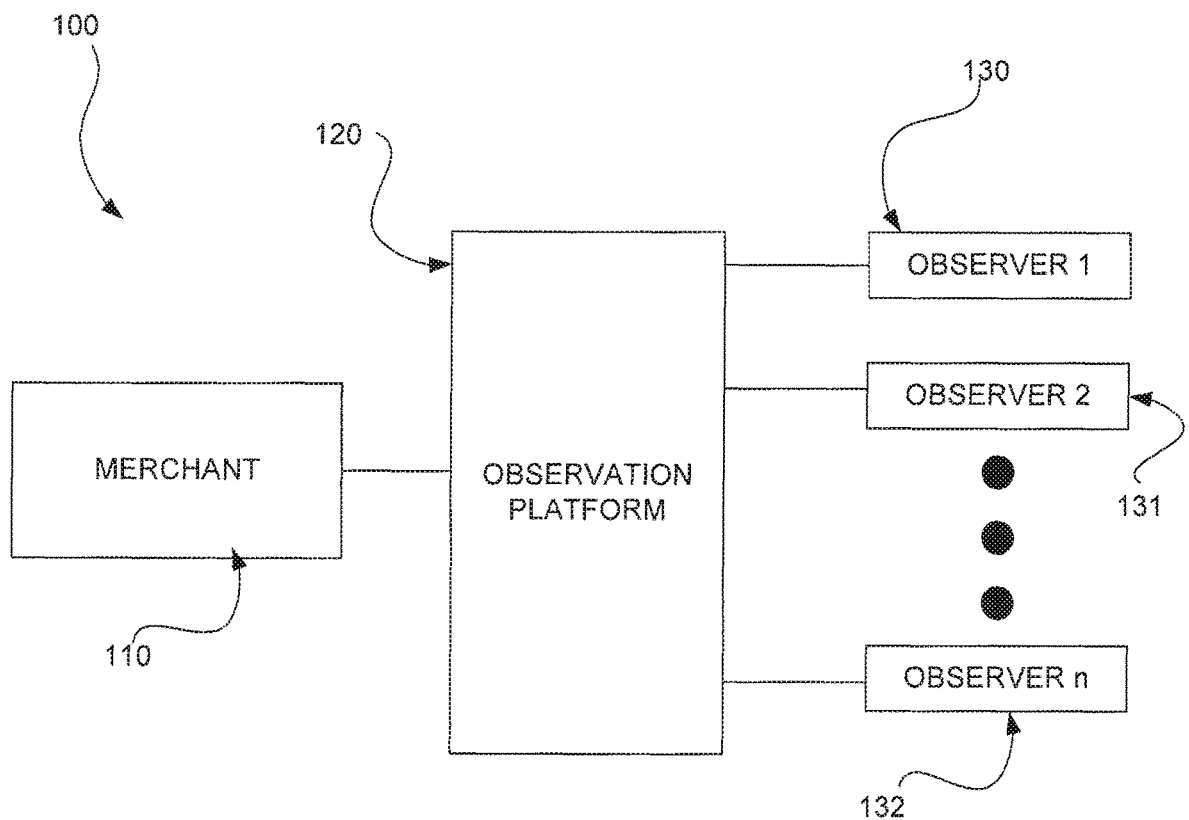
FIG. 1 is a basic block diagram illustrating elements or components of an example system in which an embodiment of the subject matter disclosed herein may be implemented.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of overview, embodiments of the systems and methods discussed herein may be directed to an observation platform for coordinators, merchants, retailers, and users to establish, utilize and fulfill an observation campaign suited to obtain, collect, and verify observable or detectable real-world data related to standards, conditions, rules, guidelines, and/or restrictions regarding the placement, display, and advertising or marketing of products and services. In some cases, the observable data may be part of an overall strategy in an observation campaign established by an observation campaign coordinator. Such a strategy may involve determining data such as (or related to) specific product placement, product pricing, collateral materials, and product incentives at a retail location. A participant or prospective participant in an observation campaign (referred to as a user or observer herein) may use an application downloaded to and executing on a computing device, to identify an opportunity to participate in an observation campaign and/or to capture specific observation campaign related data and information. For example, an observation campaign may include a set of verifiable parameters that define specific characteristics of an observation campaign strategy. These verifiable parameters may include specific observable and verifiable real-world data such as where a product is placed on a retail shelf, whether promotional materials are displayed with the product, inventory count, and/or product pricing.

Once an observation campaign opportunity is created and made available to observers, it may be "discovered" or identified (via a suitable search function and/or application) and accepted by a user/observer. The user may then collect the real-world data through various methods including, key entry, temperature observance, sound recording, video recording, barometric pressure observance, sound-pressure level observance and image capture (using one or more applications executing on a computing device, such as a mobile phone). The captured real-world data may then be uploaded to the observation platform in order to determine if the parameters of the observation campaign have been met (e.g., correct data, a sufficiently clear image, timely collection, and the like). Based on an evaluation of the collected real-world data and/or other aspects of the user's performance, each user may be associated with a user rating that reflects the user's "quality" or "reliability" as an observer or source of data for a campaign. Further, the user's rating may increase or decrease based on a number of factors, including successful data collections, quality of collected data, utility of collected data, frequency of data collections, and timeliness of data collections. These and other aspects are described in greater detail below with respect to FIGS. 1-6.

FIG. 1 is a basic block diagram illustrating elements or components of an example system 100 in which an embodiment of the subject matter disclosed herein may be implemented. In the context of FIG. 1 and other figures, a continuing example of a merchant-based observation campaign will be used. Thus, various real-world data points specific to a merchant that sells goods at retail locations will also be used in this context. However, a skilled artisan will understand that the coordinator of an observation campaign need not be a merchant with merchant-specific data points. For example, a coordinator of an observation campaign may be a quality-assurance coordinator seeking to collect data about installations of observable projects, e.g., power transmission pole installations, bathroom conditions in a public transit location, traffic conditions, and the like. In short, a coordinator of an observation campaign may be any individual, business, government agency, or entity that wishes to incentivize observers to collect real-world data from myriad locations. However, for ease of illustration and for consistent examples, the remaining disclosure will use the merchant product and retail location example without limiting the interpretation or scope of the claims or specification.

As discussed briefly above in an overview, an observation platform 120 provides systems and methods for a merchant 110 to propose, establish, and implement an observation campaign for various observers 130, 131, and 132 to collect real world data about the observation campaign established by the merchant 110. In this system 100, the merchant block 110, the observation platform block 120 and each observer block 130, 131, and 132 may represent a separate computing device or group of computing devices. Further, the connections between these computing devices may be any communication link, such as the Internet, BlueTooth™ wireless, direct serial link, and the like. The various computing device implementations and embodiments are discussed further below.

The observation platform 120 may be embodied in whole or in part as a computing system that includes one or more server computers configured in a cloud-based computing environment. Embodiments may take the form of a hardware implemented embodiment, a software implemented embodiment, or an embodiment combining software and hardware aspects. Further, various computing aspects of the underlying systems and methods may transcend any specific computing entity and the "block" diagram nature of FIG. 1 is intended to illustrate one embodiment. For example, in some embodiments, one or more of the operations, functions, processes, or methods described herein may be implemented by one or more suitable processing elements (such as a processor, microprocessor, CPU, controller, etc.) that are part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. This detailed description is, therefore, not to be taken in a limiting sense.

As alluded to, in some embodiments, the subject matter may be implemented in the context of a "cloud" based computing environment typically used to develop and provide web services and business applications for end users. Further aspects of an exemplary implementation environment will be described with reference to FIGS. 2-5 below. Note that embodiments may also be implemented in the context of other computing or operational environments or systems, such as for an individual business data processing system, a private network used with a plurality of client terminals, a remote or on-site data processing system, another form of client-server architecture, and the like.

The merchant computing device 110 may also be one or more of any number of computing device implementations. In one embodiment, the merchant computing device 110 may be a personal computer or mobile computing device. The merchant computing device 110 may be communicatively coupled to the observation platform 120 through an Internet connection or other communication network. Further, the merchant computing device 110 may be configured to execute a merchant observation application (not shown) that may provide various graphical user interfaces (GUIs) for a merchant to navigate and utilize the observation platform 120, such as, for example, defining and establishing an observation campaign. Various operations and parameters of the merchant computing device 110 are described further below with respect to FIG. 2.

Each observer computing device 130, 131, and 132 may also be one or more of any number of computing device implementations. In one embodiment, each observer computing device 130, 131, and 132 may be a mobile computing device (such as for, example, a mobile phone, a smart phone, a tablet, or a laptop computer). Each observer computing device 130, 131, and 132 may be communicatively coupled to the observation platform 120 through an Internet connection or other communication network. Further, each observer computing device 130, 131, and 132 may be configured to execute an observer application (not shown) that may provide various GUIs for an observer to navigate and utilize the observation platform 120, such as, for example, fulfilling an opportunity in an observation campaign by accepting the opportunity and submitting observed and collected data, etc. Various operations and parameters of the observer computing devices 130, 131, and 132 are also described further below with respect to FIG. 2.

Figure 2:
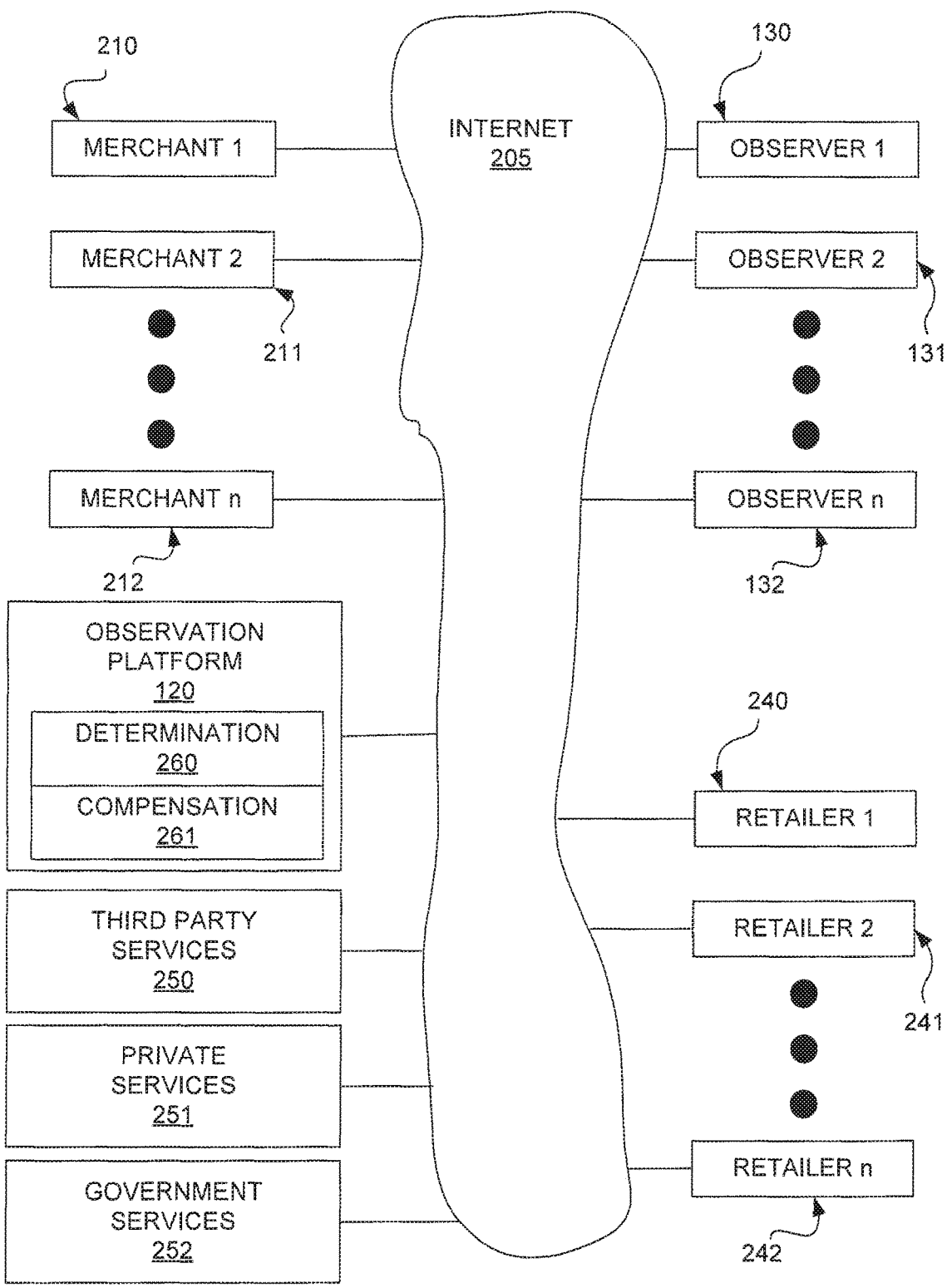
FIG. 2 is a more detailed block diagram of the basic system of FIG. 1 illustrating elements or components of an example system in which an embodiment of the subject matter disclosed herein may be implemented.

FIG. 2 is a more detailed block diagram of the basic system of FIG. 1 illustrating elements or components of an example system 200 in which an embodiment of the subject matter disclosed herein may be implemented. Some elements of FIG. 1 are also shown in FIG. 2 and bear the same reference numerals. In particular, the observation platform 120 may be coupled to computer network 205 such as the Internet, just as observer computing device 130, 132, and 132 are also connected via the network 205. A skilled artisan will understand that the designation of observer 1 130 through observer n 132 indicates that any number of observers/users may be shown as interfacing with the system 200 (whether such interfacing is discrete or collaborative). In this system 200 embodiment, more than one merchant computing device is shown. Thus, merchant computing devices 210, 211, and 212 may represent different merchants who may individually and independently craft observation campaigns using the observation platform 120 via the network 205. A skilled artisan will understand that the designation of merchant 1 210 through merchant n 212 indicates that any number of merchants may be shown as interfacing with the system 200.

Additional computing devices may also be communicatively coupled to the observation platform 120 via the computer network 205. As will be discussed further below, the system 200 may include a number of retailer computing devices 240, 241, and 242. A skilled artisan will understand that the designation of retailer 1 240 through retailer n 242 indicates that any number of retailers may be shown as interfacing with the system 200. Further, the system 200 may include computing devices associated with third party services 250, private services 251, and government services 252. Prior to discussing the additional roles for these additional computing devices, the observation platform 120 as well as the observers' and merchants' roles are discussed in greater detail.

By way of a general overview of the system in FIG. 2, one embodiment may include a user-based mobile computing device 130 (e.g., a mobile phone, a smart phone, a laptop computer, tablet, or handheld computer, a wearable computing device, an augmented reality device, and the like) configured to execute an observation application to coordinate observing and collecting of real-world data. Further, the system may include an observation server computer 120 configured to send notifications that include one or more opportunities for observations of real-word data to the user-based mobile computing device(s) 130 and configured to receive real world data observed and collected by the user-based mobile computing device(s) 130. Further yet, the system may include a merchant-based computing device 210 communicatively coupled to the observation server computer 120 and configured to generate and control a campaign of opportunities sent by the observation server computer 120.

As briefly discussed above, the observation platform 120 may be one or more computing devices configured to work as a server computing entity in a cloud-based computing environment to establish and facilitate observation campaigns for one or more merchants. As used throughout this disclosure, an observation campaign is a set of parameters established by a merchant using one or more inter-related applications operating in the system 200 and coordinated from the observation platform 120. The observation campaign may include a number of parameters designed to encourage various remote users of an observation application (e.g., observers interacting with a mobile device in which is installed such an application) to collect real-world data about products and goods for sale at various retail locations, or the status of a service being provided at a location.

The campaign may collect both qualitative and quantitative information for calculating ROI on marketing expenses. Qualitative examples may include: is the display appealing, did you like the taste of the yogurt, does the security make you feel safe and if not why not? Quantitative examples may include: Is the price 5.99, what is the price, what is the count, service took less than 5 minutes, the lawn was mowed, was the ATM was working. The data format of the campaign is standardized so that the answers can be compared both across locations, but also across time (historical) in the same locations. The campaign may be to compare the results against a standard or assist in validating a prediction.

In some embodiments or use cases, a merchant that establishes an observation campaign using the observation platform 120 desires to know more about the retail locations and point of sale for their goods and products in the marketplace. For example, a merchant may negotiate a deal to have products placed in specific eye-level locations on shelves at retail locations and may wish to verify that the products are, in fact, placed on eye-level shelves at the various retail locations. In other cases, a goal of a campaign might be to measure project progress (is the construction site leveled?), determine asset status (is a backup power generator present in all building locations?), evaluate supply chain delivery (was the correct medicine delivered without being exposed to heat?), validate a machine learning prediction (did the computer accurately predict the size of the queue at the cash register at lunchtime?).

By establishing an observation campaign that leads to the collection of real-world data (e.g., digital images of the product for sale on eye-level shelves at a particular retail location), the merchant can incentivize observers (e.g., through compensation offered by the observation platform) to fulfill the requirements of the specific real-world data collection. That is, the merchant may implement an observation campaign through a contract with a proprietor or operator of the observation platform such that the observation platform then offers monetary compensation to one or more observers in exchange for a timely and meaningful collection of real-world data (e.g., a picture) of the merchant's product for sale at a specific retail location. This eliminates the need for the merchant to employ one or more individuals to travel to the retail location to collect and verify such real-world data. In a sense, this is a form of crowd-sourcing the data collection process for a campaign.

Note that as used herein, the term "real-world data" may refer to specific observable facts or data about anything of interest to the coordinator of the campaign. Real-world data may be data that can be collected in the real world (as opposed to data that may reside on a retailer's computer). In one example, real-world data may be a digital image of a product for sale at a retail location such that useful data may be gleaned from the image, such as the product location on a shelf, the product location in proximity to other products, if the product label is facing outwards, if the product price can be seen, if the product price is correct, if additional promotional material is proximate, and the like. Real-world data includes, but is not limited to, any observable verifiable data collectable through any manner of sensing, recording, or observing.

In this manner, a merchant can use the observation platform to design an observation campaign to incentivize observers to collect very specific kinds of real-world data at very specific locations over very specific time frames. In one example, when designing an observation campaign, the merchant may establish observation opportunities based on a desired time frame; for example, a campaign may only have opportunities offered for a one-week time frame or just a few hours in any given day. Further, the merchant may establish observation opportunities based on a desired location such as retail locations in a specific city or within 100 miles of a particular location. Further yet, the merchant may establish observation opportunities based on a desired total number of observations—e.g., a "cap" of 10 different successful observations. Other possible campaign parameters are possible and discussed further below with respect to FIG. 3.

As opportunities for observation become active (that is, users of the observer application may be offered opportunities via the application) various observers may engage in the various opportunities. Opportunities may be sent as notifications to observers (via a smart phone application and the like). Such notifications may be influenced or determined by geographic location of various observers (e.g., notifications are only sent to observers proximate to a desired observation retail location). Further, such notification may be influenced by a relative reputation of an observer (e.g., only the "best" or most effective observers receive certain opportunities, such as those having a user rating above a specified threshold value).

A basis for deciding whether or not to notify or invite someone to participate in an observation campaign might also include: when was the last time they did an observation, how many have they had rejected, what did they get paid to do a similar observation, what type of equipment do they have (high vs low quality camera), what are their provable skills (speak a certain language).

Once an opportunity is received or otherwise made known to a prospective user/observer (such as by receiving a notification generated by the Observation Campaign Platform, performing a search of a set of available opportunities, receiving a message via a messaging application, etc.), the observer may accept the opportunity and begin an observation (i.e., a collection of data or information). Some opportunities may have time limits for acceptance of the opportunity and/or time limits for fulfillment of an accepted opportunity. In some examples, the observation may be executed by simply sending the requested real-world data to the observation platform 120 for evaluation. The observation platform may include a module for determining 260 whether the received real-world data from any observer meets the requirements and parameters of an opportunity in an active observation campaign. The determination module 260 may be configured to determine if the received real-world data from the observer (e.g., sent from a user-based mobile computing device) fulfills one or more criteria for data collection in the observation campaign opportunity.

Such criteria may include, but are not limited to (or required to include) timeliness, image quality, data applicability, data completeness and the like. Note that the criteria may depend upon characteristics of the campaign, but in general relate to a provable quality of the data. For example, if the data is an image, is it not blurry and of the right areas in a store?; if the data is a video, is it long enough?; if the data is an opinion, is it clearly written; if the data is quantitative, does it match what shows up in the pictures/videos; were the campaign instructions followed correctly?; timing issues—how long did it take the person to obtain the real-world data after they accepted?; were there unusual support needs—did the person require excessive assistance to complete the tasks involved? Note that in some cases, any problems with the collection process or data quality may lower a user rating; for example, accepting an observation opportunity and not properly completing the tasks will typically lower a user's rating. Conversely, accepting opportunities and completing the tasks quickly and correctly may raise a user's rating, as would receiving positive feedback from an end customer.

If the determination module 260 determines that the received real-world data from an observer meets the requirements of an observation opportunity, (e.g., the opportunity has been fulfilled), then a compensation module 261 may initiate compensation to the observer for successfully fulfilling an observation campaign opportunity. Such compensation may be financial or non-financial. In one embodiment, the compensation module 261 may communicate with one or more third-party services to credit a bank account associated with the observer or observers that fulfilled the opportunity. Further, the compensation module may also track total financial compensation paid to specific observers and communicate said total to government services 252 on an annual or other periodic basis for purposes of compliance with any relevant regulations or laws. In other embodiments, the compensation module 261 may communicate with other private services 251, such as social media or online retail, to provide non-financial remuneration to the observer. For example, the observer may qualify for discounts or privileges at third party locations (e.g., food coupons, gift cards, free entry into a sporting event, and the like).

FIG. 3 is a data structure diagram illustrating parameters of an example observation campaign 300 used in conjunction with the system of FIG. 2 according to an embodiment of the subject matter disclosed herein. As discussed above, one or more merchants (210-212 of FIG. 2) may establish and coordinate an observation campaign with several different configurable parameters. FIG. 3 is an illustration of a data structure of one embodiment of an observation campaign 300. It is understood that the parameters shown in FIG. 3 are illustrative and any number or type of parameters (either similar or different, and greater or fewer than shown in FIG. 3) may be present. These parameters assist in shaping how observers will be incentivized to collect real world data in response to opportunities presented in the campaign 300. It is also understood that certain identification and demographic parameters (such as merchant name, merchant product, bank data, and the like) may also be established with respect to the merchant. These are not discussed in further detail here as the focus of FIG. 3 is on the customizable parameters of an observation campaign 300.

A first parameter by which a merchant (or other entity seeking to incentivize the collection of real-world data for purposes of confirming proper adherence to rules or requests regarding the display or other characteristics of a product being offered for sale at a location) may customize an observation campaign 300 is a total cost outlay 310. In this respect, the merchant and the proprietor of the observation platform reach an agreement about the total cost of the observation campaign. The observation platform may then set specific compensation rates for successful observation in order to meet the needs of the established observation campaign. Further, the merchant or the observation platform may choose to designate a maximum (or minimum) amount of financial compensation to be awarded to an observer or observers for successfully retrieving real-world data in fulfillment of an observation opportunity. This may be an aggregated amount on a per campaign basis. For example, a merchant may wish to collect data about as many product placements as possible until a threshold amount of money has been reached (in terms of financial compensation to all observers in an aggregate manner). This total may also be an aggregate cost outlay for non-financial outlay (e.g., a limit of 10 discount coupons awarded).

The observation platform operator or manager may also change the compensation offered based on user rating or timing; for example, the compensation offered may be adjusted based on how much time is left in the campaign or the value of a user rating. In one case, the compensation might start at a price of $5.00, which would be offered for 5 days; if this failed to attract enough participants or qualified participants, then the compensation offered might be increased by $1 to try and complete the campaign. Similarly, the compensation offered might depend upon a user or observer rating; in this case, it may be desired to attract a certain number or percentage of "qualified" or more reliable observers by offering greater compensation to those having a higher rating or a rating above a specified threshold.

In addition to the total cost outlay, the merchant may also configure a parameter associated with a total cost per observation 311. In this manner, the individual observation may be capped at a maximum amount of financial or non-financial compensation. The merchant may also define a minimum cost per observation and can establish a sliding scale for cost per observation according to a number of different variables. For example, the merchant may choose to pay more per observation for the first 10 observations and then drop the cost per observation. As another example, the cost per observation may be higher during a particular time period, such as late night and then lower during a different time period, such as morning. Thus, additional parameters regarding variable cost per transaction 317 may be configured.

The merchant may configure a parameter associated with a total number of observations 312. In this manner, each observation may be counted and once a limit has been reached, the campaign may be suspended or terminated. The merchant may also define a minimum number of observations needed in order for a campaign to end at a time limit or within a time frame 313. Still further, the merchant may establish a fixed time frame 313 in which the campaign must begin and end. For example, the merchant may choose to establish a time frame of June $1^{st}$ to June $30^{th}$ for which a total number of observations is limited to 1000; in this case, once 1000 observations are reached, the campaign may end. Also, the merchant may establish 100 observations as a minimum threshold in which case, the campaign can only end on June $30^{th}$ if 100 observations are entered.

The merchant may configure a parameter associated with a geographic limitation or boundary 314 of the campaign. Several geographic parameters may be established, such as a relative geographic limit of a state, city of country or an absolute geographic limit of within 500 miles of a specific location (company headquarters, for example). There may be additional parameters about limiting the number of observation within geographic regions or limiting the total cost outlay associated with a geographic region. Further yet, cost per observation may be configured on a per region basis (e.g., paying more for region 1 than region 2).

The merchant may configure a parameter associated with a diminishing cost per observation 315, choosing to pay more for initial observations as compared to later observations. In another example, the parameters may be reversed to pay more for each additional observation after a certain threshold has been reached. Further, the merchant may limit observers who can participate in a campaign to only those observers who have reached a specific observer reputation score or ranking 316.

Additional parameters in a campaign may include failure parameters 318 that may act to suspend or terminate a campaign if a threshold of failed observations is entered or the real-world data collected in initial observations indicates that additional failures will be imminent or predictable. There may be restrictions on the type and quality of images received from observers based on image quality parameters 319. The merchant may establish opportunity lockout parameters 320 for observers who accept an opportunity and are then given two hours of exclusivity to the opportunity to fulfill it. Lastly, in this embodiment, a merchant may define a successful campaign termination parameter 321 so that a campaign may end when a threshold number of successful observations has been reached or a statistically valid number of successful observations is reached. Note that there are additional parameters that may be configured in an observation campaign 300, but are not described in as much detail herein.

As an example, suppose that a campaign is measuring several store brands (e.g., Safeway, PCC) and it is noticed that based on data collected for an observation campaign, one of the two is performing poorly/perfectly. In this case, the campaign may be temporarily suspended to provide time for an investigation into the causes or issues involved. Similarly, campaigns may be increased in scope/size based on failure rates, and recurring campaigns may be started/paused based on failure rates. Further, based on ongoing results of a campaign, the questions, task description, locations for data collection may be changed, added, or reordered automatically by the platform/system. Note that a machine learning model or another form of data analysis may be used to improve the selection of the primary or secondary campaign parameters. For example, based on historical data and the campaign parameters (type of product, locations [rural, urban, etc.]), a campaign coordinator may choose locations based on predicted bad locations. Questions can be changed, added, or reordered based on predicted results. Pricing of the compensation may be set based on the predicted speed/quality of the observers that would be expected to perform the observations and data collection.

Figure 4:
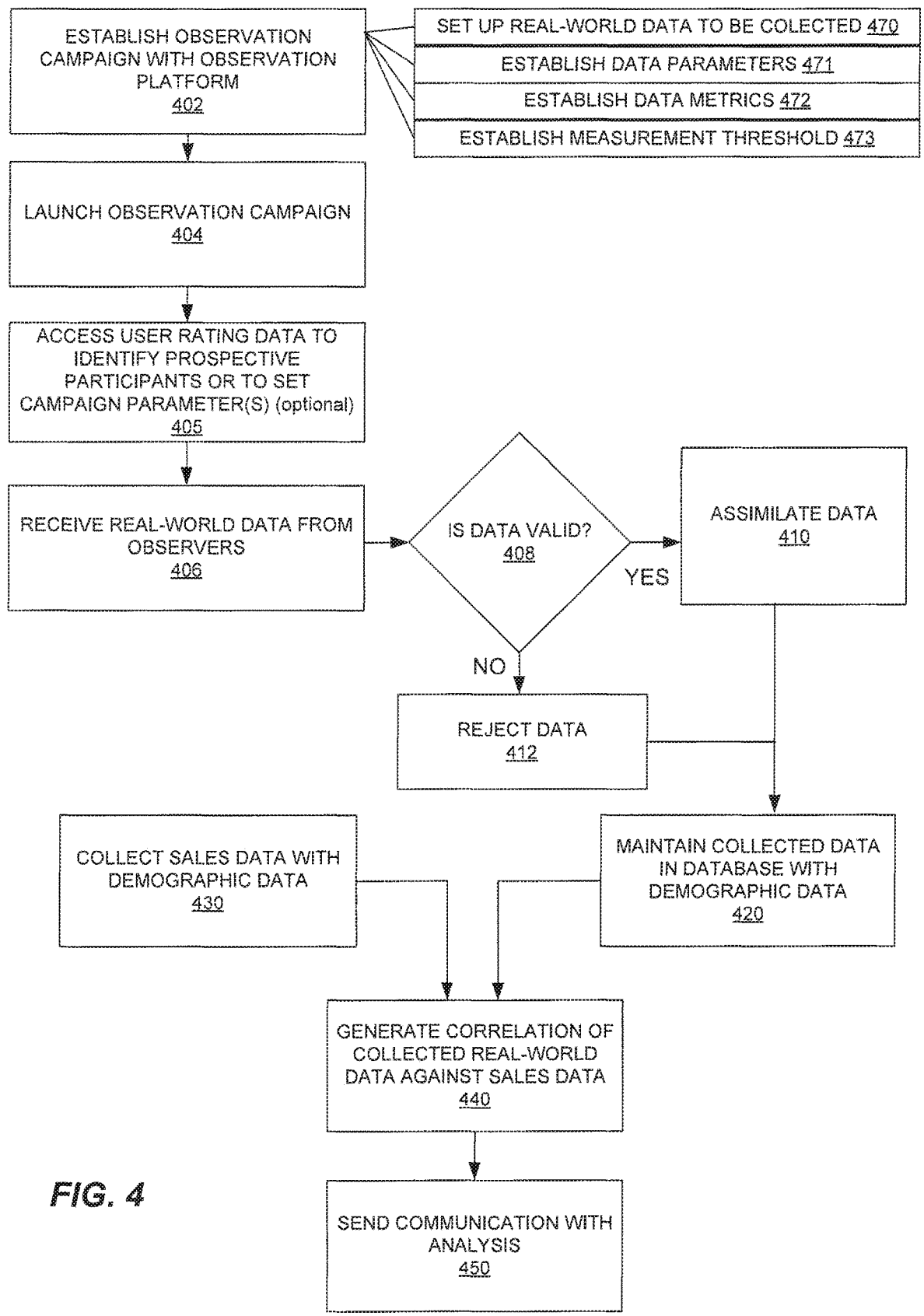
FIG. 4 is a flow chart or flow diagram illustrating a method, process, operation or function for establishing, managing, administering, and updating or modifying a real-world data observation campaign, based at least in part on collecting sales data in order to generate correlation data between the real-world data and the sales data, according to an embodiment of the subject matter disclosed herein.

FIG. 4 is a flow chart or flow diagram illustrating a method, process, operation or function for establishing, managing, administering, and updating or modifying a real-world data observation campaign, based at least in part on collecting sales data in order to generate correlation data between the real-world data and the sales data, according to an embodiment of the subject matter disclosed herein. In one example implementation, a coordinator of an observation campaign may establish specific sales data collection targets along with real-world data collection targets. These sales data collection targets may specify specific sales data that is desired to be monitored or collected, along with the products or services whose sales are being collected, a timeframe in which collection is desired, and any other parameters that may be relevant to a campaign and/or to a place of business or operations where a product is being offered or displayed for sale. In this manner, the sales data collected contemporaneously with the real-world data (or reflective of the real-world data) may be used to generate correlation data for an observation campaign. That is, a campaign coordinator or other party may analyze and measure an effectiveness of an observation campaign over time by generating correlation data for the observation campaign in terms of resultant sales data or sales data changes at various points in time.

However as recognized by the inventors, in a complex environment implemented on a cloud platform involving many unrelated individuals, a great amount of guess work may be involved in establishing the initial values of the parameters of an observation campaign. This introduces an element of uncertainty with regards to the effectiveness of the campaign as it is initially formulated and with regards to the value of the information collected, since information may satisfy the parameters of the observation campaign but fail to be satisfactory for use in further processing or evaluation. Thus, a campaign coordinator may also establish metrics involving specific parameters of the campaign (as suggested by step or element 472 of FIG. 4), where a result of comparing the collected real-world data (or information/metadata about that real-world data) to one or more of the metrics may result in altering or modifying a parameter of the campaign.

As an example, an observation campaign may establish a specific geographic location having a perimeter surrounding a map point (e.g., a radius of one mile surrounding a location). In one embodiment, any potential observer that travels into the one-mile radius region may then receive an alert via an observation application executing on the observer's smart phone, with the alert indicating that an observation opportunity is available. However, a metric may be established that tracks the number of observations performed over a set time period. Thus, if 24 hours pass without a single observation (or without a sufficient number to indicate that enough information has been collected), this metric may be used as the basis for altering the one-mile radius parameter that controls which potential observers are notified. For example, the radius may be increased to two miles or three miles and then the collected information or number of fulfilled observation opportunities again compared to the metric for the parameter.

As another example, an observation campaign may be established providing opportunities to observers that offers a $5.00 payment in return for a valid observation. After a set period of time or after a set number of submitted observations, the rate of successful (i.e., acceptable or valid) observations over the time period may be analyzed against a metric. In one embodiment, this analysis may determine that the observation campaign is returning more observations than what is required for meaningful, statistical conclusions to be drawn about the real-world data. As a result, the observation campaign parameter regarding payment offered per observation may be reduced from $5.00 to $3.00 to reduce the number of potential observers being incentivized to collect data for that observation campaign.

Thus, a system and method may be established wherein the observation campaign platform receives electronic communications from one or more remote computing devices (user's/observer's smart phones, for example) wherein each electronic communication includes real-world data corresponding to parameters of an observation campaign (such as an image of a product on display, an observer's notes regarding the general condition of the location, a description of collateral information available near the product, etc.). The observation campaign platform then analyzes the received real-world data against a metric corresponding to (such as being based on, derived or generated from, or incorporating) one or more parameters defined for the campaign, and determines whether any parameter should be changed to increase the likelihood of a successful campaign.

As suggested by FIG. 4, in some embodiments, an observation campaign may be established or defined by a manufacturer, distributor or provider of a product or service at an observation campaign platform (as suggested by step or stage 402). For example, the observation campaign may be established by an observation campaign coordinator (an entity wishing to know about the presentation/display of retail products offered for sale at retail locations) who may select a number of campaign parameters defining an overall observation campaign; that is, the observation campaign may be described or defined by certain parameters or characteristics (such as those represented by the data structure illustrated in FIG. 3).

As shown in FIG. 4, such parameters or characteristics may include a list or description of the real world data to be collected (as suggested by element 470, and for example, an image of a product on display and its surroundings), the parameters of that data (471) (such as image size or resolution, time at which image or other data is desired to be collected, etc.), relevant metrics for evaluating the validity or utility of collected data (472), and a measurement threshold value used to decide what amount constitutes a sufficient number (minimum or maximum) of measurements for the campaign (473) or for alteration of a parameter of the campaign.

As suggested, the various metrics (472) defined or described by a campaign coordinator may provide tools for analysis and evaluation of the collected real-world data, where such analysis may result in the modification of one or more campaign parameters or characteristics. As mentioned, the campaign coordinator may establish various measurement thresholds (at step 473) such that an established threshold is to be met before an analysis is triggered that may result in altering a parameter. That is, a specific number of observations (e.g., a threshold of observations) may be needed before any meaningful analysis can be (or should be) conducted that results in the observation campaign parameters being altered.

Once all real-world data settings, parameters, metrics and thresholds are established or defined, the observation campaign may be "launched" (as suggested by step 404), which refers to the process of making participation in the campaign available to users. Launching the observation campaign may include storing all established settings, parameters, metrics and thresholds in a data store at, or otherwise associated with, the observation campaign platform. In some embodiments, the observation campaign parameters and settings may be searchable by an observation campaign application executing on one or more remote mobile computers to enable prospective users/observers to identify observation opportunities of interest to them. In other embodiments, electronic communications may be generated and sent to remote mobile computers that meet a specific set of criteria (e.g., being within a geographic location, being associated with a user/observer having an observer reputation or rating score above a certain threshold, and the like) (as suggested by step 405). In some embodiments, user rating data may be accessed and utilized to identify one or more prospective participants, or to set certain campaign parameters (405).

As observers respond to opportunities presented through the now discoverable or accessible observation campaign, real-world data may be received and collected, where this real world data is collected or acquired by one or more users/observers (406). The data received by the observation platform may then be subjected to one or more "tests", evaluations, or comparisons to determine if it is valid data (408). For example, an assessment may be made to determine if a received digital image is in focus or captures the correct real-world data. As another example, metadata about the real-world data, such as timestamp, and IP address origination and path may be used to validate the received real-world data. If the data (or a portion of it) is found to be valid, then the valid data is typically assimilated or integrated into a database containing real world data collected for that particular campaign (410 and 420). If the data (or a portion of it) is found to be invalid, then the invalid data may be rejected and not subject to further analysis (412).

Note that the database in which the collected (and valid) data is stored is maintained by the observation platform (420), and may include demographic data corresponding to one or more of the user/observer, the point of sale location, the competitive products, etc. In some embodiments, sales and additional demographic data may be collected by users/observers, with the sales data being collected approximately contemporaneously with the product or sales environment related real-world data (430). That is, the sales data is intended to represent the approximate sales or sales trends at the time at which the real-world data is collected.

Next, the process determines or identifies one or more correlations between the collected real-world data and the approximately contemporaneous sales data (440). These correlations may be identified by suitable data processing, such as by matching the time period or interval over which data was collected to sales data for that period or interval, or sales data for the period leading up to an observation campaign. In general, the one or more embodiments measure or observe attributes (examples: on shelf, not on shelf, pricing correct, product in stock, product displayed correctly, location in relation to competitor, location on shelf, etc.) and then use sales data and outcomes (examples: sales above/below expectations, sales above/below average for similar stores, sales above/below prior period, etc.) to examine relationships between the attributes and the sales data or outcomes. To determine a mathematical or other form of relationship (such as "If an attribute has a value of X, then sales is likely to be altered by Y") between attributes and sales data or outcomes, embodiments may use one or more techniques such as machine learning, neural networks, genetic algorithms, linear/non-linear regression, etc. In some cases, the observation platform may contact one or more of a user/observer, an agent, a merchant, or a client of the platform (such as a product manufacturer or distributor who requested the campaign) to provide an analysis of the results and in some cases, provide a recommended course of remedial or corrective action (450).

Based on the analysis of one or more of the real-world data, the sales data, or the demographic data (if collected or available), a real-time communication (as suggested by step 450) may be generated to communicate the results of the analysis to any number of recipients. This communication may be in the form of a change to a display of a mobile device of a user that just collected the real-world data (e.g., the application receives an update or notification that is presented to the user via the application or other communication protocol in the phone). The communication may suggest to the user/observer to collect other data, to verify certain information, to request that the proprietor of the location where the data was collected contact the observation campaign coordinator, etc.

Note that examples of possible determined or identified correlations may include one or more of the following, where the noted possible correlation between sales data and observed data may be relevant to deciding whether to modify a campaign or contact an observer, a POS, or a client of the observation platform:

Sales are above expectations when new marketing material is presented correctly in 20% of stores, so marketing campaign is extended to all stores. Without the benefit of the observation platform, it may not have been possible to notice the initial sales increase, due to many of the test stores not displaying material correctly;

A family of products is displayed as expected in the store, but is without sufficient inventory for purchase a certain percentage of the time—without the observation platform, the stores and frequency of unavailable inventory for purchase would not be known and the relationship to sales level unable to be determined; or Sales of Cereal X are on average $1000 per store per month in California—one of the stores suddenly has lower sales, and with the monthly observations as managed by the observation platform, it is noticed that the Cereal is on the bottom shelf in that store only that month. In response, the store is contacted and the Cereal is moved to the eye-level shelf that was part of the contract with the store chain headquarters.

As another example, observation data may be collected, with sales data representing the sales of a product or set of products at a baseline time also being collected (i.e., prior to the observation campaign being executed or if already executed, prior to any further modifications). The observation campaign is then implemented (or modified and re-implemented), which may lead to changes in the arrangement, placement, or display of a product and any related information (such as coupons, incentives, collateral materials, etc.) from the configuration prior to the campaign (or prior to the modified campaign). The sales data is then collected again after the modifications, and as a result, the effectiveness and value of the campaign may be demonstrated in increasing sales, reducing losses, stimulating the purchase of multiple items, encouraging the use of a coupon or other promotional item, etc.

Note that the observation and sales data and any analysis demonstrating a relationship or correlation between the two may be shared with the store buyer to help bring non-compliant or dissimilar locations to a desired standard of operation, to negotiate for additional product space, to negotiate for modification to product placement, to negotiate modification to restocking frequency, to negotiate changes to store back stocking levels, to negotiate frequency of delivery of restock to store locations, etc.

As noted, in one embodiment, an observation campaign may be established and operated in a manner consistent with the steps of the process flow or method illustrated in FIG. 4. Once enough real-world data is collected as part of a given observation campaign, sales data may be collected and processed, where the sales data represents sales or sales trends that are substantially contemporaneous with the collected real-world data. That is, sales data may be tracked or compared against the collected real-world data over time (e.g., October sales vs October observations). After enough data is collected and compared, correlation data representing a relationship between the sales data and the observed real-world data may be identified and assembled. This data may be analyzed to assist in making decisions related to product placement, product advertising, etc. For example, one may identify an emergent pattern showing an increase in sales when observations are above a specific threshold (which might indicate a need to correct certain aspects of the product display or marketing on a regular basis to ensure higher sales). As another example, one may identify a drop in sales when the price per observation falls below a specific threshold (which might indicate that prospective observers are not interested in making observations in sufficient numbers or at the most desirable times to ensure that the observations are able to identify and correct potentially harmful point of sale factors on an efficient basis). The collected and correlated data may be communicated to retailer and observation campaign coordinators, along with suggestions for improving sales and/or modifying the observation campaign parameters.

Other examples of uses of sales data as part of influencing an observation program, or as indicators of a desired change to an observation program parameter or implementation include, but are not limited to:

If a promotional campaign is failing to produce expected results, normally the campaign would be cancelled after sales data is received.

By using the benefits of the observation platform, the company could know that the campaign was not actually happening, so instead of cancelling the campaign and losing the investment, they can communicate with the stores involved and work to get the campaign properly in place.

Other examples of how an observation campaign might be altered based on the collection of sales related data, or the sales data chosen to be collected altered based on the campaign include, but are not limited to:

A campaign may be cancelled or moved to an area where there is a larger possibility of success;

Sales data may be chosen based on filtered or aggregated characteristics of the observation data. By recognizing patterns in the observation data, one can start to look for reasons to further analyze sales data for causation;

Note that machine learning may be used to relate sales data to characteristics of a sales location (i.e., sales as a factor of various POS characteristics used to suggest modifications to certain of those characteristics);

Some attributes of a sales location are publicly available (population, etc.), while others can be measured real-time and on-site by an observer (e.g., is there product, is the box on its side, did the poster get put up close enough to the product, etc.). Machine learning can be used to look at location attributes without overweighting some, as is sometimes the case with a use of simple linear regression;

Note that sales data may be processed or evaluated to identify a correlation with the observation campaign parameters by any suitable method or process, including, but not limited to:

The observation platform can receive or access the data in a suitable form (CSV, DB, API calls, etc.) and then the platform uses one or more of the described mathematical operations or techniques to find correlations;

The data processing may also (or instead) be performed on the customer side using techniques they have available after downloading the data from the platform.

Figure 5:
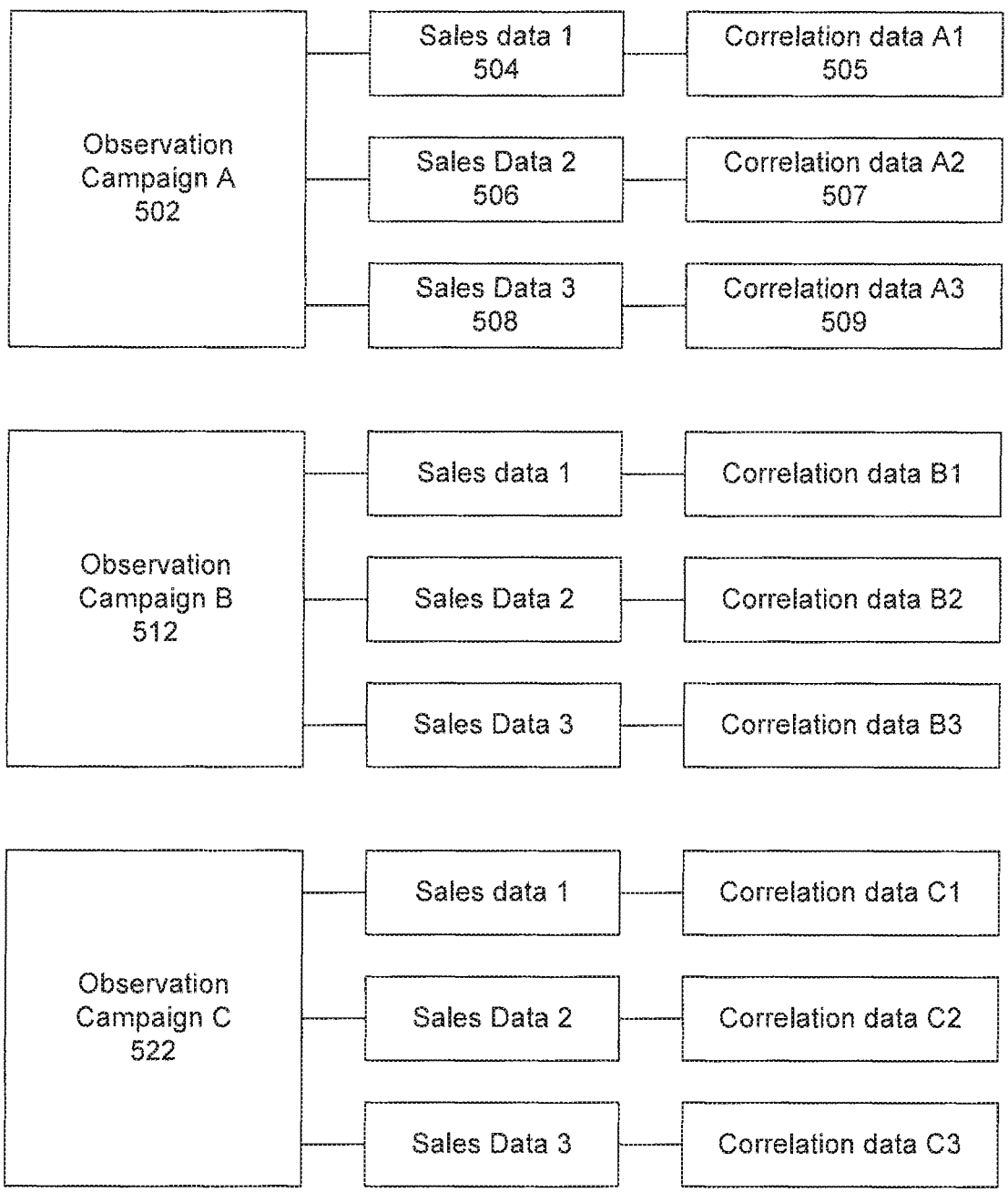
FIG. 5 is a an illustration of an organization of sales data against real-world data from various observation campaigns, showing correlation data that may be generated and analyzed according to an embodiment of the subject matter disclosed herein.

FIG. 5 is an illustration of an organization of sales data against real-world data from various observation campaigns, showing correlation data that may be generated and analyzed according to an embodiment of the subject matter disclosed herein. In this diagram, three different observation campaigns (elements 502, 512, and 522 in the figure) may be analyzed against three different sets of sales data (elements 504, 506, and 508 corresponding to Campaign A, and similarly for Campaign B and Campaign C). This results in three different sets of correlation data, one for each set of sales data (elements 505, 507, and 509). The correlation data may be established as correlating a set of parameters from the observation campaign real-world data against the collected sales data corresponding to substantially the same time frame(s).

Examples of data that may be collected and processed to evaluate its correlation with sales data includes, but is not limited to (or required to include) the following. How the processed or evaluated data might impact the parameters of a campaign is also noted. Note that this could permit the implementation of a feedback loop between campaign parameters, the data collected, and actual sales data.

Total number of observations against total sales.
May indicate foot traffic in an area, so potential buyers.
Total number of observations against sales by region.
May indicate how one store in a region is more popular than another, even though general demographic data would say they are the same.
Price offered per observation against total sales.
Lower prices generally indicate a more popular region as there are more observers willing to take the task on.
Note that this may also represent a more economically depressed area.
Demographic data of region and price per observation against regional sales data.
Demographic data is generally older (US census), and one can get more accurate measurements of demographics by polling observers in the region.
This may also represent a more economically depressed area.
Observation failure rate against total or regional sales data.
Higher failure rate is generally correlated with lower sales, but not always.
Sales data within a region with failure rate can point out specific stores with compliance issues.
If product is regularly out-of-stock, may indicate a very positive sales opportunity for that region, as the product is popular. High failure rate with POS data showing selling out of product means store should order more product.
Retailer compliance record against same store sales.
Retailer compliance with product placement standards/agreement can change from period to period and the ability to capture observations over time will demonstrate correlation of sales impact to compliance.
Retailer compliance record against user rating of observers.
Observers with higher rating generally delivery better information enabling stronger correlation between compliance and sales.
Sales data against user rating of observers.
Based on the ability of observers with higher ratings to capture more complete information that delivers a stronger correlation between compliance and sales—having the ability to attract higher user rated observers to perform observations will impact the ability to capture better information allowing for stronger correlation(s), and therefore the ability to affect changes to store execution so that they comply with agreed upon standards, resulting in higher sales.

Cross-product sales data against observations on a single product.

Knowing that the promotional campaign of another product is often paired with the customer's, the sales data can be correlated for information. For example, the successful execution of a campaign for tonic water can be correlated to higher sales of Gin X in locations with a measured success in a campaign and lower for those that failed.

Retailer feedback rate against total sales data.

Some retailers only report sales data on a quarterly basis. If the only way BrandX measures the success of the campaign is on sales data, they will not be able to spot deviations in the campaign and correct them within a selling period or sales window.

Retailer sales data against differing observation campaigns.

If the platform is being used to measure or observe different products in the same retailer, correlations can be drawn based upon the actual and predicted compliance rates of that retailer on all products/campaigns in their stores, individually and across the chains.

Demographics of failure rates against demographics of success rates.

This allows the customer to separate out the perceived effects of demographics when in reality, it may be the compliance rate. For example, if sales went really low in "poor" areas, a customer might think campaign didn't work because of "poor" demographics. Instead, using the observation platform, they may be able to determine that the reality is that the "poor" demos just didn't put the campaign material out, so the initial correlation was proved wrong.

Sales data against notification to retailer rate.

Given that the platform can send notifications based on any frequency chosen by the customer, this can influence both sales and the data being looked at. Also, the notifications may be positive or negative (e.g., negative for corrective action and positive for positive reinforcement).

Demographic data against top failure regions.

Perceived correlation such as the relationship of demographic data to the sales of a particular item, product type, or category can be questioned and even refuted based on the capture of observations, allowing the measurement of other variables that show a stronger correlation to sales. Therefore failure rates for stores, or regions, may not necessarily be related to demographic data and may instead be due to other factors captured in the observations.

Embodiments of the system and methods disclosed herein focus on drawing specific conclusions about the data collected from the real world. For example, collected and verified data may be compared to sales data; point of sale (POS) locations that fail to properly use promotional materials may show reduced sales. Further, the data collected may be used to identify failure rate demographics as well as demographic feedback on specific failure points. This may lead to providing retailer focused feedback after a failure is identified. Further yet, one could use multiple campaigns for cross-product promotions. As data is correlated with retailers, the retailers may develop a rating or reputation score for compliance and such data may be communicated to the retailer at the client's choosing.

Figure 6:
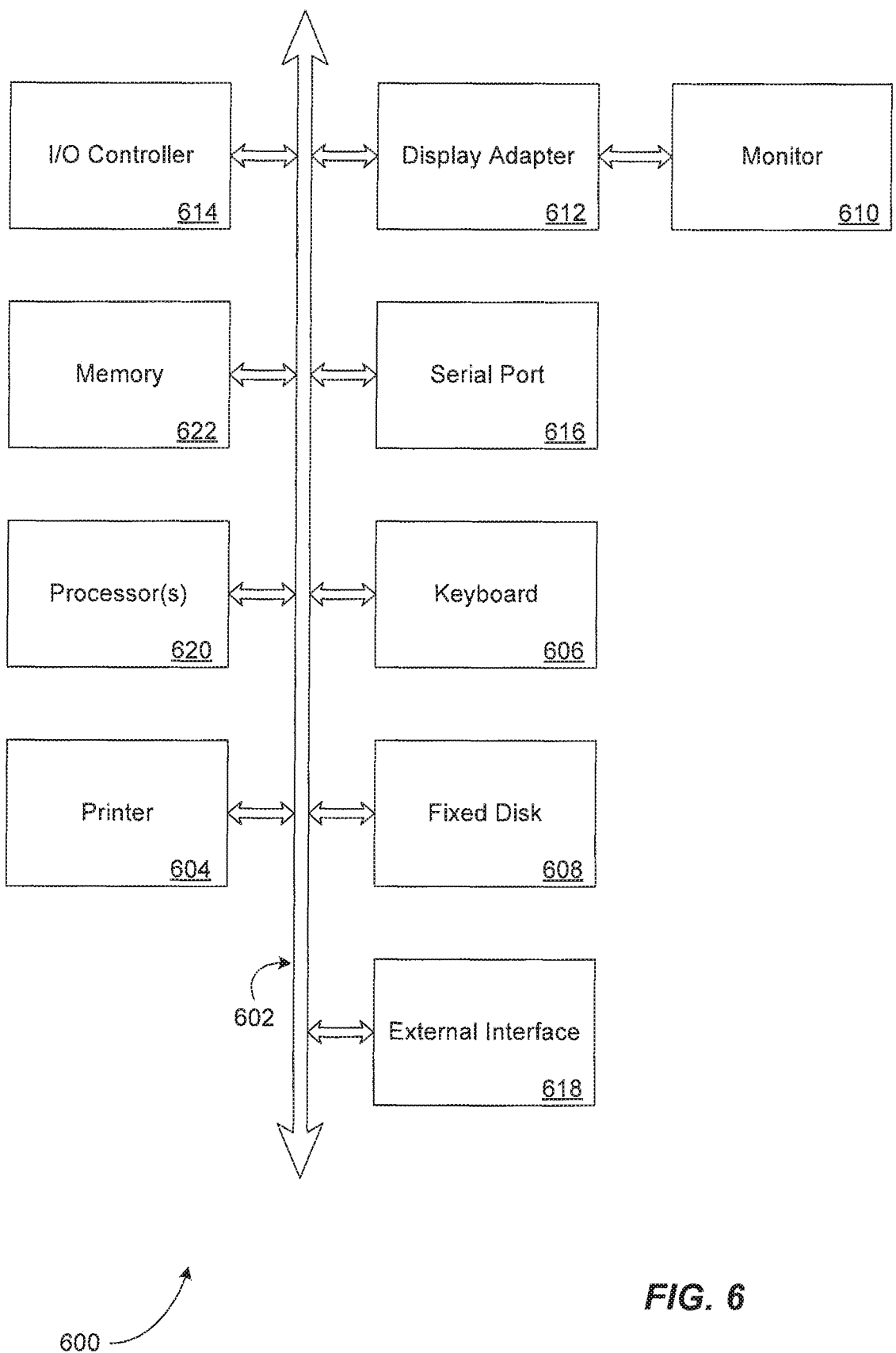
FIG. 6 is a diagram illustrating elements or components that may be present in a computer device or system configured to implement a method, process, function, or operation in accordance with an embodiment of the subject matter disclosed herein.

FIG. 6 is a diagram illustrating elements or components that may be present in a computer device or system configured to implement a method, process, function, or operation in accordance with an embodiment of the subject matter disclosed herein. In accordance with one or more embodiments, the system, apparatus, methods, processes, functions, and/or operations may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 6 is a diagram illustrating elements or components that may be present in a computer device or system 600 configured to implement a method, process, function, or operation in accordance with an embodiment. The subsystems shown in FIG. 6 are interconnected via a system bus 602. Additional subsystems include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted.

Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A computer-based method, comprising:
   establishing an observation campaign at a data observation computing platform executing a real-world observance opportunity application for the collection of real-world data regarding a product or service;
   identifying one or more users for participation in the observation campaign, each user having a mobile computing device executing a real-world data observation application thereon that is communicatively coupled to the data observation computing platform executing the real-world observance opportunity application;
   sending at least one communication as a first push notification to at least one computing device of at least one user; the communication including a level of compensation offered to a user for fulfillment of a real-world observance opportunity, wherein sending the electronic communication corresponding to the opportunity is based upon a detected proximity of the mobile computing device to a location associated with the opportunity;
   in response to the at least one communication of the real-world observance opportunity, obtaining real-world data related to the product or service from the one or more users through activity directed by the user of a mobile computing device, the obtained real-world data comprising audio visual data about the product and meta data about the location of the product collected using the mobile computing device, the real-world data received through an electronic communication from at least one of the mobile computing devices;
   obtaining sales data related to the product or service from a merchant computer that is associated with a coordinator of the observation campaign, the sales data received through an electronic communication from the merchant computer;
   in response to obtaining the sales data and in response to obtaining the real-world data, correlating the sales data with collected real-world data to identify a correlation between the real-world data received and the sales data in response to receiving the real-word data and sales data;
   modifying the level of compensation offered for fulfillment of the real-world observance opportunity in response to the correlation and communicating the modification to the merchant computer contemporaneously with the correlation;
   updating the one or more mobile computing devices using a second push notification with the modified level of compensation.

2. The method of claim 1, wherein establishing the observation campaign includes specifying one or more parameters of the campaign.

3. The method of claim 2, wherein the modifying further includes modifying one or more parameters of the campaign.

4. The method of claim 1, wherein identifying one or more users for participation in the observation campaign further comprises:
   sending an electronic communication corresponding to an opportunity to observe real-world data to a set of users, the electronic communication sent to one or more remote computing devices associated with each user and sent from a data observation computing platform; and
   receiving a response to the electronic communication from one or more of the users to which the communication was sent.

5. The method of claim 1, wherein the collected real-world data includes one or more of
   an image of a product being displayed at a specific location;
   an image of an area around a product being displayed at a specific location; or
   a user's comments or observations regarding a product being displayed at a specific location.

6. The method of claim 1, wherein correlating the sales data with collected real-world data further comprises determining a relationship between sales of the product or service and one or more of the time period before, during, or after the collection of the real-world data.

7. The method of claim 1, wherein the modifying further comprises one or more of:
   a total number of observations desired;
   a type of data being collected;
   a placement of the product;
   a placement of collateral information regarding the product or service; and
   a price of the product or service.

8. The method of claim 1, further comprising making a list of available observation campaign opportunities available to one or more prospective users or observers on a webpage.

9. A computing system, comprising:
   a user-based mobile computing device configured to execute an observation application to coordinate observing and collecting of real-world data, the observing including collection of audio visual data about a product and meta data about a location of the product;
   an observation server computer configured to push a first notification that includes one or more opportunities for observations of real-world data to the user-based mobile computing device and configured to receive real-world data observed and collected by the user-based mobile computing device in response to the push notification, wherein the observation server computer is further configured to send the first push notification corresponding to the opportunity based upon a detected proximity of the user-based mobile computing device to a location associated with the opportunity;

a sales correlation engine having a computer-based method executing on the observation server computer to process the real-world data observed and collected by the user-based mobile computing device in response to receiving the real-world data, the processing of the real-world data including accessing sales related data for a product or service for which the real-world data is being collected;

correlating the accessed sales related data with the received real-world data; and in response to the correlation, modifying a level of compensation offered for fulfillment of the one or more opportunities for observations of real-world data; and a merchant-computing device communicatively coupled to the observation server computer and configured to generate and control a campaign of opportunities pushed by the observation server computer, wherein the observation server computer is configured to push information about the modification to the merchant-computing device in response to the modification, wherein the merchant-computing device updates the one or more mobile computing devices using a second push notification with the modified level of compensation.

10. The computing system of claim 9, wherein the real-world data includes one or more of:

an image of a product being displayed at a specific location;

an image of an area around a product being displayed at a specific location; or a user's comments or observations regarding a product being displayed at a specific location.

11. The computing system of claim 9, wherein the observation server computer further comprises a module configured to determine if the received data from the user-based mobile computing device fulfills one or more criteria for data collection.

12. The computing system of claim 9, wherein the user-based mobile computing device comprises one of the group comprised of: a mobile phone, a smart phone, a laptop computer, and handheld computer, a wearable computing device, and an augmented reality device.

13. The computing system of claim 9, wherein the modifying further includes modifying one or more parameters of the campaign.

14. The computing system of claim 9, wherein correlating the sales data with collected real-world data further comprises determining a relationship between sales of the product or service and one or more of the time period before, during, or after the collection of the real-world data.

15. The computing system of claim 9, wherein the modifying further comprises one or more of:

a total number of observations desired;

a type of data being collected;

a placement of the product;

a placement of collateral information regarding the product or service; and a price of the product or service.

\* \* \* \* \*

UNITED STATES PATENT AND TRADEMARK OFFICE
CERTIFICATE OF CORRECTION

PATENT NO. : 10,997,616 B2
APPLICATION NO. : 15/821285
DATED : May 4, 2021
INVENTOR(S) : Hugh Howard Holman and Erik Eugene Chelstad Page 1 of 1

It is certified that error appears in the above-identified patent and that said Letters Patent is hereby corrected as shown below:

In the Claims

Column 21, Claim 1, Line 40: Please replace "real-word" with "real-world"

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*